United States Patent [19]
Pearson et al.

[11] Patent Number: 5,937,209
[45] Date of Patent: Aug. 10, 1999

[54] CAMERA WITH FILM GUIDE RIB HAVING FILM-ON-SPROCKET RETENTION PORTION

[75] Inventors: Douglas H. Pearson, Rochester; Jeffrey A. Solomon, Spencerport, both of N.Y.

[73] Assignee: Eastman Kodak Company, Rochester, N.Y.

[21] Appl. No.: 09/003,795

[22] Filed: Jan. 7, 1998

[51] Int. Cl.[6] .................................................. G03B 17/07
[52] U.S. Cl. .............................. 396/6; 396/440; 396/541
[58] Field of Search ............................. 396/6, 440, 441, 396/442, 535, 538, 541

[56] References Cited

U.S. PATENT DOCUMENTS

| | | |
|---|---|---|
| 2,186,633 | 1/1940 | Drotning . |
| 2,266,426 | 12/1941 | Koszalka, Jr. et al. . |
| 3,377,936 | 4/1968 | Goshima et al. . |
| 3,380,361 | 4/1968 | Winkler . |
| 4,477,162 | 10/1984 | Matsumoto . |
| 4,751,538 | 6/1988 | Konno . |
| 4,954,857 | 9/1990 | Mochida et al. . |
| 4,972,649 | 11/1990 | Mochida et al. . |
| 5,140,354 | 8/1992 | Burnham . |
| 5,608,486 | 3/1997 | Takagi et al. ................................ 396/6 |

*Primary Examiner*—Howard B. Blankenship
*Attorney, Agent, or Firm*—Roger A. Fields

[57] ABSTRACT

A camera comprising a main body part having a backframe opening for exposing successive sections of a filmstrip, a metering sprocket rotatably supported on the main body part proximate the backframe opening and having respective teeth that can project through individual perforations in the filmstrip to engage successive sections of the filmstrip at the backframe opening, and a rear cover part having a plurality of parallel film guide ribs longitudinally extending to guide successive sections of the filmstrip over the backframe opening, is characterized in that one of the film guide ribs includes an integral portion configured to at least partially surround the teeth of the metering sprocket one at a time, in a predetermined location at which each tooth projects from one of the perforations in the filmstrip, to retain a film section at the backframe opening in engagement with the tooth.

5 Claims, 4 Drawing Sheets

CAMERA WITH FILM GUIDE RIB HAVING FILM-ON-SPROCKET RETENTION PORTION

FIELD OF THE INVENTION

The invention relates generally to the field of photography, and in particular to cameras. More specifically, the invention relates to a one-time-use camera with a film guide rib that has a film-on-sprocket retention portion.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer.

As shown in prior art U.S. Pat. No. 4,954,857 issued Sep. 4, 1990 discloses a one-time-use camera comprising a main body part having a backframe opening for exposing successive sections of a filmstrip, a metering sprocket rotatably supported on the main body part proximate the backframe opening and having respective teeth that can project through individual perforations in the filmstrip to engage successive sections of the filmstrip at the backframe opening, and a rear cover part having a plurality of parallel film guide ribs longitudinally extending to guide successive sections of the filmstrip over the backframe opening. There is nothing provided in the area that each one of the teeth project through the perforations in the filmstrip, which would retain successive sections of the filmstrip in engagement with said metering sprocket. However, as depicted in U.S. Pat. No. 4,477,162 issued Oct. 16, 1984, it is known for a rear cover part to include a short groove for this purpose.

SUMMARY OF THE INVENTION

A camera comprising a main body part having a backframe opening for exposing successive sections of a filmstrip, a metering sprocket rotatably supported on the main body part proximate the backframe opening and having respective teeth that can project through individual perforations in the filmstrip to engage successive sections of the filmstrip at the backframe opening, and a rear cover part having a plurality of parallel film guide ribs longitudinally extending to guide successive sections of the filmstrip over the backframe opening, is characterized in that:

one of the film guide ribs includes an integral portion configured to at least partially surround the teeth of the metering sprocket one at a time, in a predetermined location at which each tooth projects from one of the perforations in the filmstrip, to retain a film section at the backframe opening in engagement with the tooth.

DETAILED DESCRIPTION OF THE INVENTION

Figure 1:
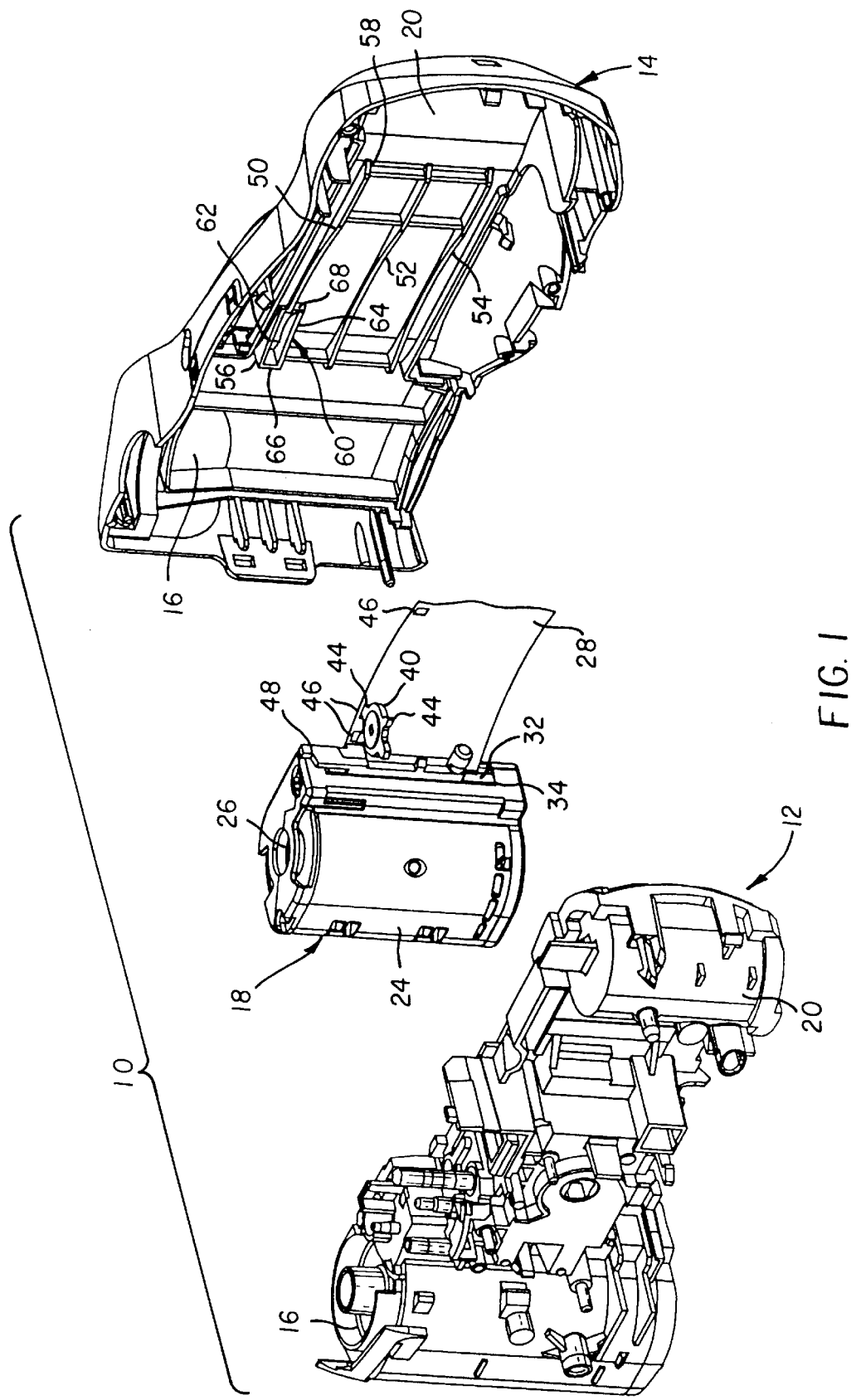
FIG. 1 is an exploded front perspective view of a one-time-use camera according to a preferred embodiment of the invention, showing a main body part and a rear cover part.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 illustrate a partially shown one-time-use camera 10 comprising a main body part 12 and a rear cover part 14 which connect together to form a light-tight unit. The main body part 12 and the rear cover part 14, when connected together, define a cartridge receiving chamber 16 for a known film cartridge 18 and a film roll chamber 20 for an unexposed film roll 22.

The film cartridge 18 is similar in operation to ones disclosed in prior art U.S. Pat. Nos. 5,357,303 issued Oct. 18, 1994 and No. 5,231,438 issued Jul. 7, 1993. The film cartridge 18 includes a cartridge housing 24 that contains a flanged spool 26 on which successive sections of a filmstrip 28, beginning at the unexposed film roll 22, are to be wound after each film exposure at a backframe opening 30 in the main body part 12. A slightly elastic light lock 32 is supported within a film passage slot 34 in the cartridge housing 24 to be pivoted open to permit film movement into the cartridge housing and to be pivoted closed to prevent ambient light from entering the cartridge housing through the slot. FIGS. 1–4 show the film cartridge 18 with the light lock 32 open and the filmstrip 28 being wound into the cartridge housing 24.

Figure 2:
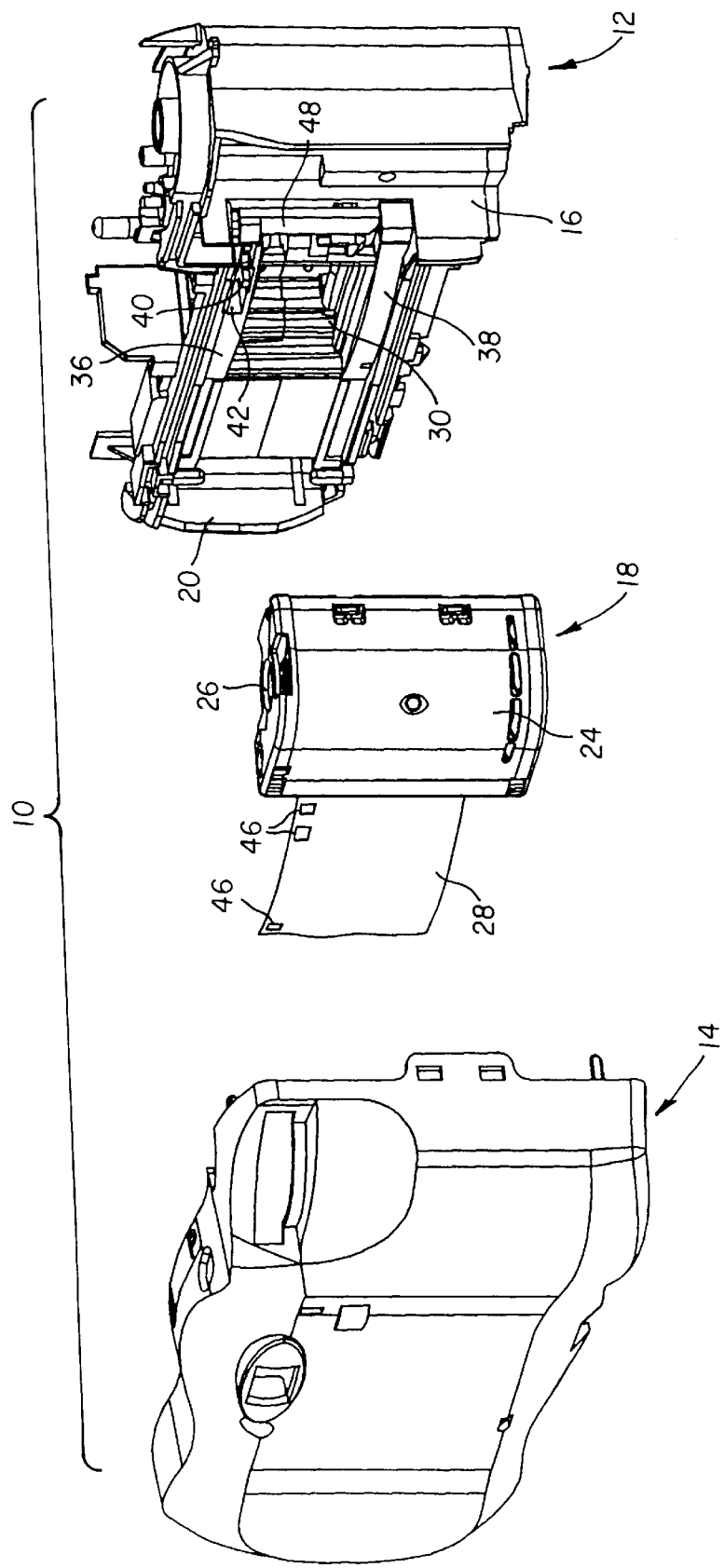
FIG. 2 is an exploded rear front perspective view of the one-time-use camera, showing the main body part and the rear cover part.
Figure 3:
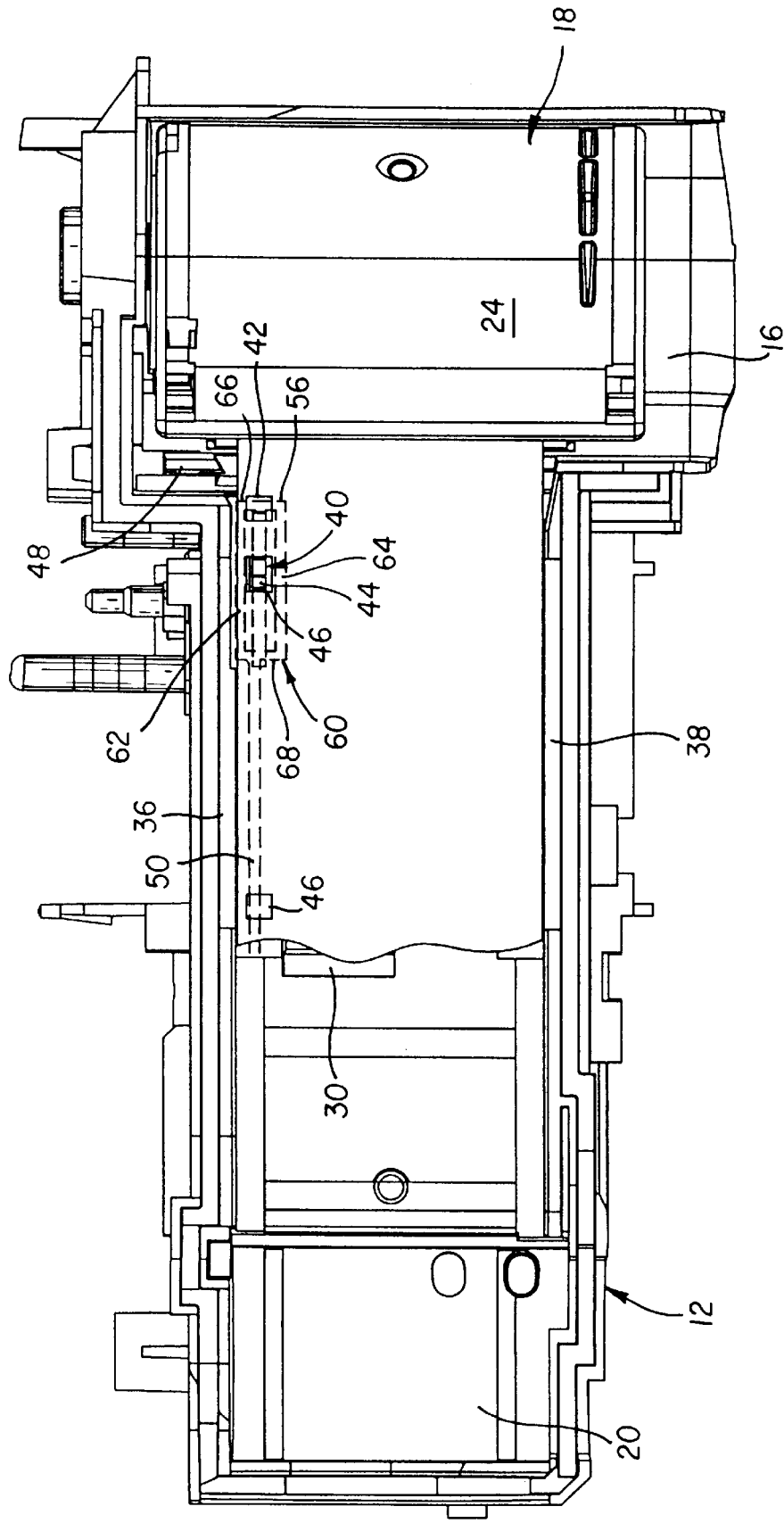
FIG. 3 is a rear elevation view of the main body part.
Figure 4:
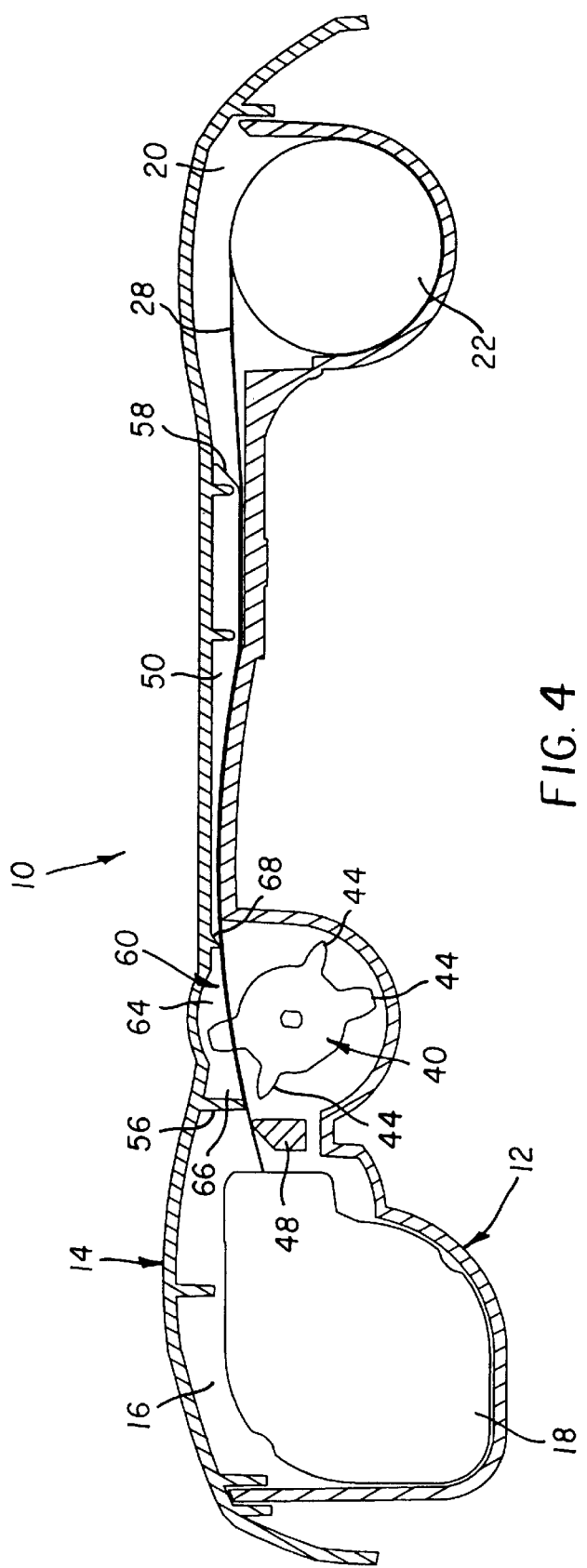
FIG. 4 is a top sectional view of the main body part and the rear cover part.

As shown in FIGS. 2 and 3, the main body part 12 includes an integral pair of parallel film rails 36 and 38 longitudinally extending alongside the backframe opening 30. A known metering sprocket 40, shown in FIGS. 1–4, is rotatably supported on the main body part 12 partially within a cavity 42 in the film rail 36. The metering sprocket has four teeth 44 that can project through respective perforations 46 in the filmstrip 28 to engage successive sections of the filmstrip at the backframe opening 30 during each film exposure. A known film presence/absence sensor 48 is supported on the main body part 12 between the film passage slot 34 in the cartridge housing 24 and the backframe opening 30 to initiate closing the light lock 32 after the filmstrip 28 is wound completely into the cartridge housing. The film sensor 48 is spring-urged against the filmstrip 28.

The rear cover part 14 has three parallel film guide ribs 50, 52 and 54 longitudinally extending to guide successive sections of the filmstrip 28 over the backframe opening 30. The three film guide ribs 50, 52 and 54 and the two film rails 36 and 38 are similarly curved to curve successive sections of the filmstrip 28 over the backframe opening 30 during each film exposure. The film guide rib 50 has a pair of opposite ends 56 and 58 and an integral rectangular-shaped film retention portion 60. The film guide rib 50 is bifurcated at its integral film retention portion 60 to form a pair of parallel curved rib portions 62 and 64. A pair of parallel side rib portions 66 and 68 of the film retention portion 60 interconnect the parallel curved rib portions 62 and 64. The side rib portion 66 is longer, i.e. projects farther from the rear cover part 14, than the side rib portion 68 and includes the opposite end 56 of the rib 50. As shown FIGS. 3 and 4, the film retention portion 60 is dimensioned to completely surround the teeth 44 of the metering sprocket 40 one at a time, in a predetermined location at which each tooth projects from one of the perforations 46 in the filmstrip 28, to retain a film section at the backframe opening 30 in engagement with the tooth.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. rear cover part
16. cartridge receiving chamber
18. film cartridge
20. film roll chamber
22. unexposed film roll
24. cartridge housing
26. flanged spool
28. filmstrip
30. backframe opening
32. light lock
34. film passage slot
36. film rail
38. film rail
40. metering sprocket
42. cavity
44. sprocket teeth
46. film perforations
48. film presence/absence sensor
50. film guide rib
52. film guide rib
54. film guide rib
56. opposite end
58. opposite end
60. film retention portion
62. curved rib portion
64. curved rib portion
66. side rib portion
68. side rib portion

What is claimed is:

1. A camera comprising a main body part having a backframe opening for exposing successive sections of a filmstrip, a metering sprocket rotatably supported on said main body part proximate said backframe opening and having respective teeth that can project through individual perforations in the filmstrip to engage successive sections of the filmstrip at the backframe opening, and a rear cover part having a plurality of parallel film guide ribs longitudinally extending to guide successive sections of the filmstrip over said backframe opening, is characterized in that:

one of said film guide ribs includes an integral portion configured to at least partially surround said teeth of said metering sprocket one at a time, in a predetermined location at which each tooth projects from one of the perforations in the filmstrip, to retain a film section at said backframe opening in engagement with the tooth, said one film guide rib is bifurcated at its integral portion to form a pair of parallel rib portions and a pair of side rib portions which interconnect said parallel rib portions, and one of said pair of side rib portions projects farther from said rear cover part than the other one.

2. A camera as recited in claim 1, wherein said integral portion of said one film guide rib is configured to completely surround said teeth one at a time in said predetermined location.

3. A camera as recited in claim 1, wherein said one film guide rib has a pair of opposite ends, and said integral portion of said one film guide rib forms one of said opposite ends of the one film guide rib.

4. A camera as recited in claim 3, wherein said one film guide rib including its integral portion is curved to curve successive sections of the filmstrip at said backframe opening.

5. A camera as recited in claim 1, wherein said one of said pair of side rib portions includes an end portion of said one film guide rib.

* * * * *